United States Patent [19]

Polen et al.

[11] Patent Number: 4,503,921

[45] Date of Patent: Mar. 12, 1985

[54] WEIGHING SYSTEM

[75] Inventors: Karl L. Polen; Edward S. Scott, both of Alliance, Ohio

[73] Assignee: The Alliance Machine Company, Alliance, Ohio

[21] Appl. No.: 529,556

[22] Filed: Sep. 6, 1983

[51] Int. Cl.³ .......................... G01G 19/14; B66C 1/40
[52] U.S. Cl. .................................. 177/147; 73/862.56; 212/158
[58] Field of Search ............................. 177/147, 145; 73/862.56, 862.66; 212/158

[56] References Cited

U.S. PATENT DOCUMENTS

| | | | |
|---|---|---|---|
| 3,565,196 | 2/1971 | Laimins et al. | 73/862.66 X |
| 3,899,034 | 8/1975 | Polen et al. | 177/151 |
| 4,237,727 | 12/1980 | Lockery et al. | 73/862.66 |
| 4,368,792 | 1/1983 | Ottle | 177/147 |
| 4,413,691 | 11/1983 | Wetzel | 177/147 |

Primary Examiner—E. A. Goldberg
Assistant Examiner—Patrick W. Foster
Attorney, Agent, or Firm—Buell, Ziesenheim, Beck & Alstadt

[57] ABSTRACT

A novel weighing system for cable hoist sheave systems is provided which utilizes a plurality of shear type load cells arranged in a stable 3-point configuration which is capable of supporting side loadings without destroying the vertical reading. Uneven distribution of the material does not affect the stability of the system and an accurate weight of the load is determined.

5 Claims, 8 Drawing Figures

WEIGHING SYSTEM

This invention relates to a weighing system which utilizes shear type load cells in a load handling system. The invention is an improvement over that disclosed in our U.S. Pat. No. 3,899,034 issued Aug. 12, 1975. The weighing system of the present invention eliminates inaccurate readings of the weight caused by misalignment of the load cells.

Weighing systems are commonly used with material handling devices such as ladle crane hanger, scrap chargers, conveyors and cable hoists. A weighing system in conjunction with a loadhandling crane hanger permits the operating personnel to know how large the load being handled is at any particular time. This information enables the operators to determine a variety of things. In a ladle crane it permits the operator to determine when there is not enough molten steel remaining for another ingot and thereby prevents the waste of an ingot due to an insufficient amount of metal. It permits the operator to know if he has overloaded the crane. In earlier U.S. Pat. No. 3,899,034 there was disclosed a weighing system which generally overcame many of the problems faced by the art in connection with ladle crane hanger weighing systems. In that system the inventors provided load cells between the sheave basket and ladle hanger. In order to stablilize the sheave basket in the load hanger the inventors used truss rods and bolted flexure plates designed to allow the basket to move within the limits of deflection of the load cells. This system in general worked satisfactorily. Unfortunately, however, despite all the obvious advantages of using a weighing system such as that of U.S. Pat. No. 3,899,034, it was discovered that any misadjustment or a destructive impact can change these truss rods and flexure plates and cause misalignment of the load cells leading to inaccurate impulses from the load cells to the electronic counters, thus producing a false readout.

In U.S. Pat. No. 4,368,792, subsequently granted to applicants' assignee, these problems of truss rod and flexure plate misalignment were addressed. That patent provides a weighing system which is comprised of fixed and movable load cells at each end of the surface on which the load is contained. The plurality of cells are arranged so that they act as a stable 3-point system. Two load cells are fixed and two are movable at each end between the sheave basket and load hanger. This is exactly as described in the earlier U.S. Pat. No. 3,899,034. The movable cells adjust to the load distribution thereby avoiding the overloading of any cell Thus, cell's limits are not exceeded and an accurate reading is fed from each cell to the counter. The ladle hanger in the present invention is provided with accurately machined pads and threaded holes with adjustment bolts which engage accurately machined guides and pads on the sheave basket so that the sheave basket can be accurately set in the ladle hanger and held against such transverse movement as will affect the accuracy of the load cells. This solved many of the problems of the earlier weighing systems. However, the structure still required carefully machined guides and pads to provide reasonable accuracy and prevent damage.

The present invention completely eliminates the need for check rods or deflection plates or the like devices required to keep the parts in vertical alignment so that accurate readings can be made.

The present invention provides a system based upon the use of shear beam load cells in a three point suspension as distinguished from compression type load cells. The accuracy of the system is greater because of the fact that none of the vertical load which is to be recorded is lost in deflecting the check rods and deflection plates. The three point suspension compensates for misalignment and deflection permitting the loading on the cells to remain constant which is necessary to obtain accurate weight reading.

In the present invention, we provide a weighing system in combination with the upper sheave assembly of a crane. We, preferably, provide a support frame, an upper sheave assembly for a crane having a sheave on said support frame, a sheave pin on which the sheave rotates, a fixed load block supporting one end of said pin, a pivot load block supporting the other end of said pin, a first pair of shear beam load cells fixed at one end on the support frame and connected at the other end to the fixed load block, a second pair of shear beam load cells fixed at one end on the support frame and a pivotable connection between the other end of said second pair of shear beams and the pivot load blocks whereby the said one end of the sheave pin is fixedly supported and the other end is pivotally supported. Preferably, the said other end of the second pair of shear beam load cells is connected to the pivot load block by a ball and socket mounting. The load blocks may be attached to a sheave basket or they may simply support the sheave pin ends without a basket.

In the foregoing general description, we have set out certain purposes, objects and advantages of our advantage. Other objects, purposes and advantages will be apparent to those skilled in the art of material weighing when considering the following description and the drawings in which.

Figure 1:
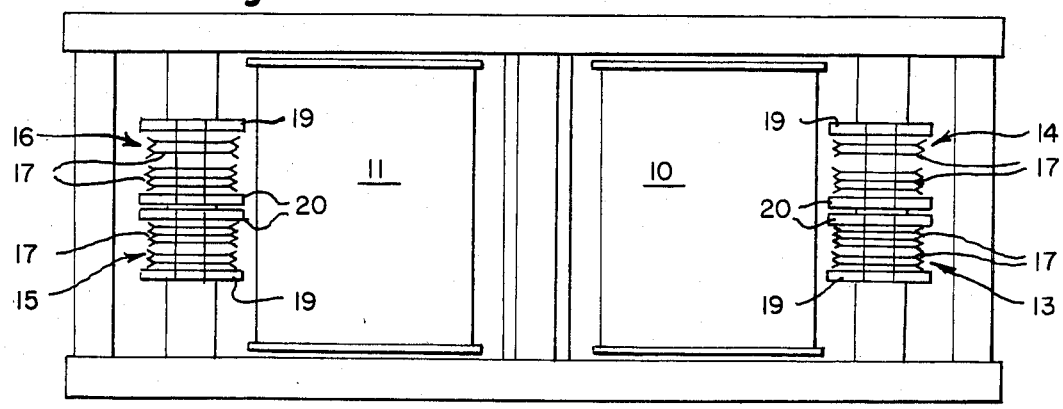
FIG. 1 is a top plan view of a crane with the upper sheaves employing the weighing system of this invention.
Figure 2:
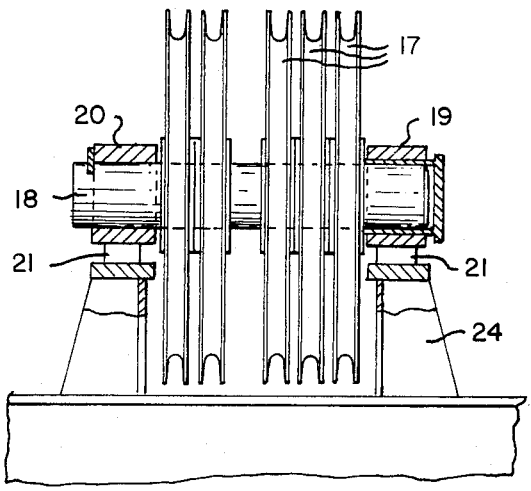
FIG. 2 is a section through a sheave assembly and weighing device according to this invention.
Figure 3:
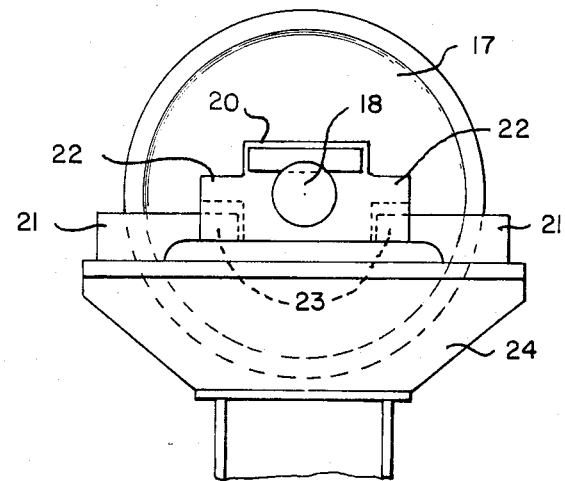
FIG. 3 is an end elevation of the sheave assembly of FIG. 2.
Figure 4:
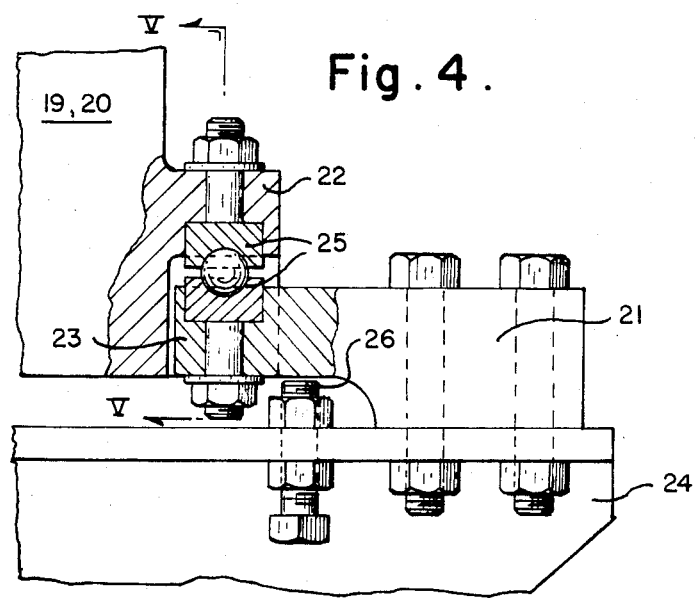
FIG. 4 is an enlarged fragmentary section of a ball and socket mounting between each load block and a shear beam load cell according to this invention.
Figure 5:
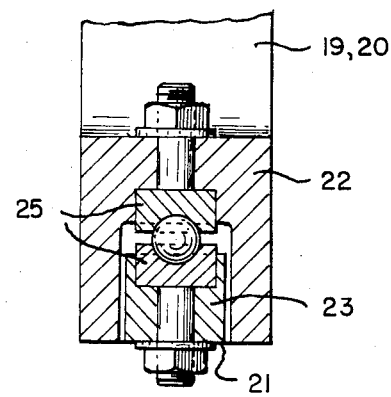
FIG. 5 is a section on the line V—V of FIG. 4.

Referring to the drawings we have illustrated a crane having a pair of hoist drums 10 and 11 and two sheave assemblies 13 and 14 and 15 and 16 spaced therefrom over which lift cables (not shown) pass from the drums to the bottom lift sheave (not shown). The sheave assemblies are made up of one or more sheaves 17 rotatable on a sheave pin 18 supported on load blocks 19 and 20, one fixed at one end of the sheave pin and the other pivoted on the other end of the sheave pin as hereafter described. Each load block is supported on opposite sides by shear beam type load cells 21. The fixed load block 20 supports one end of sheave pin 18 which is keyed in load block 20 to prevent rotation. Load block 20 is provided with arms 22 extending from opposite sides over the free cantilevered ends 23 of shear beam load cells 21 which are fixed at the opposite ends to a support frame 24. Load block 19 pivotally supports the other end of sheave pin 18 and is likewise provided with arms 22 extending from opposite sides. Each of these arms 22 carries half of a ball and socket connection 25, the other half of which is carried by the cantilevered ends 23 of the shear beam load cells, as shown more fully at FIGS. 4 and 5. An overload stop 26 is provided on the support frame. This fixed load block 20 thus forms two points of a three point suspension, one point at each ball and socket con-nection. The third point is the pivot load block 19.

The foregoing mounting prevents erratic load conditions caused by misalignment and deflections. The load cells are thus subjected to the load which is to be recorded thus making the system capable of the desired accuracy.

Figure 6:
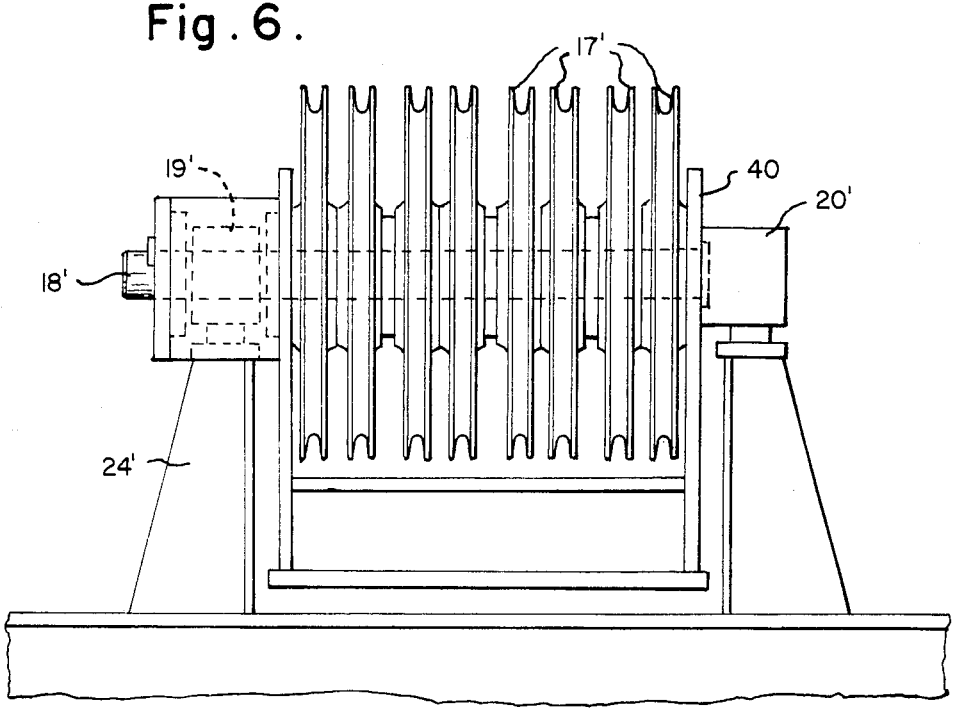
FIG. 6 is an elevational view of a sheave assembly of a second embodiment of upper sheave assembly employing a sheave basket and the invention.
Figure 7:
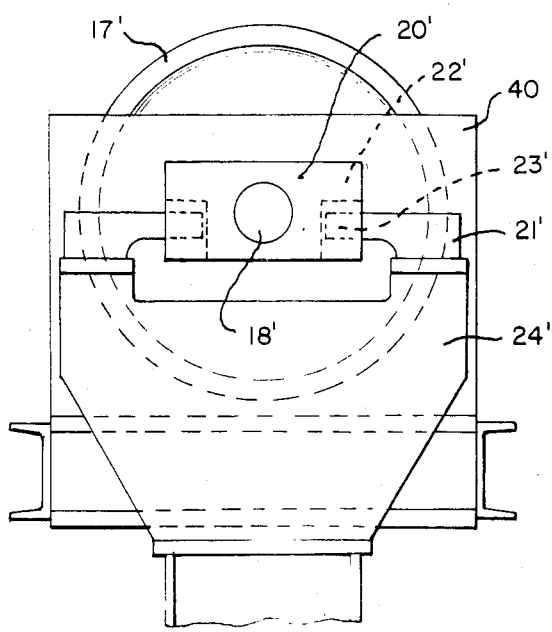
FIG. 7 is an end elevational view of the fixed end of the assembly of FIG. 6.
Figure 8:
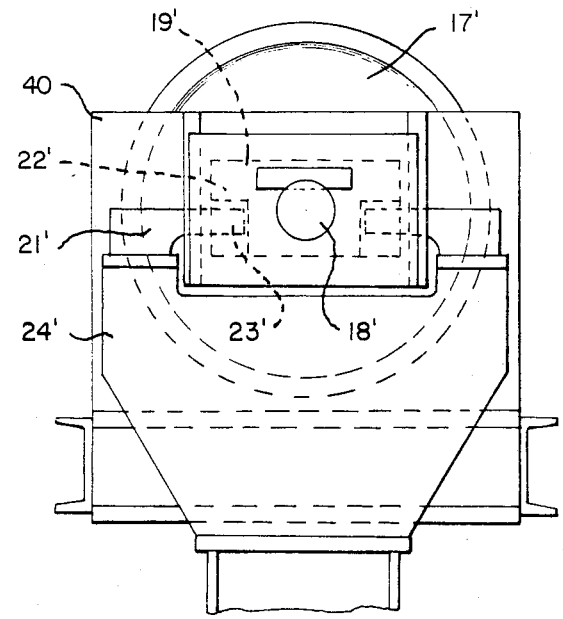
FIG. 8 is an end elevational view of the pivot end of the assembly of FIG. 6.

In FIGS. 6, 7 and 8 we have illustrated a second embodiment in which like parts carry like numbers with a prime sign. The primary difference is the inclusion of a sheave basket 40 on which the load blocks 19' and 20' are fastened. The sheave pin 18' is journalled in the sheave basket ends at the load blocks. The load blocks are in turn supported at the fixed load block 20' by arms 22' extending from opposite sides over the free cantilevered ends 23' of shear beam load cells 21'. Pivot load block 19' pivotally supports the basket 40 and the other end of sheave pin 18' and is likewise provided with arms 22' extending from opposite sides. Each arm, as in the first embodiment, carries half of a ball and socket connection 25; the other half of which is carried by the cantilever arm 23 of a shear beam load cell as shown in detail in FIGS. 4 and 5. Again, an overload stop 26 is provided on the support frame.

In the foregoing specification we have set out certain preferred practices and embodiments of our invention, however, it will be understood that this invention may be otherwise embodied within the scope of the following claims.

We claim:

1. A weighing system comprising a support frame, an upper sheave assembly on said support frame having at least one sheave, a sheave pin on which said at least one sheave rotates, a fixed load block supporting one end of said sheave pin, locking means fixing said one end of said sheave pin in said fixed load block, a pivot load block pivotally supporting the other end of said sheave pin, a first pair of shear beam load cells fixed at one end to the support frame and pivotally connected at the other end to the fixed load block, a second pair of shear beam load cells fixed at one end to the support frame spaced from said first set and pivotally connected at the other end to said pivot load block whereby said one end of the sheave pin is fixedly supported and the other end is pivotally supported.

2. A weighing system as claimed in claim 1 wherein said at least one sheave is supported in a sheave basket and the load blocks are fixed to the sheave basket on opposite ends thereof.

3. A weighing system as claimed in claim 1 or 2 wherein the load blocks and shear beam load cells are pivotally connected through a ball and socket connection.

4. A weighing system comprising a support frame, an upper sheave assembly on said support frame having at least one sheave, a sheave pin on which said at least one sheave rotates, a fixed load block supporting one end of said sheave pin, locking means fixing said one end of said sheave pin in said fixed load block, a pivot load block pivotally supporting the other end of said sheave pin, a first pair of shear beam load cells fixed at one end to the support frame and pivotally connected at the other end to the fixed load block, a second pair of shear beam load cells fixed at one end to the support frame spaced from said first set and pivotally connected at the other end to said pivot load block whereby said one end of the sheave pin is fixedly supported and the other end is pivotally supported, said at least one sheave being supported in a sheave basket and the load blocks being fixed to the sheave basket on opposite ends thereof, said load blocks and shear beam load cells being pivotally connected through a ball and socket connection and each load block being provided with arms on opposite sides having a bottom groove resting over the said other end of said shear beam load cells and a ball and socket connection between said arms and said other end of the load cells.

5. A weighing system comprising a support frame, an upper sheave assembly on said support frame having at least one sheave, a sheave pin on which said at least one sheave rotates, a fixed load block supporting one end of said sheave pin, locking means fixing said one end of said sheave pin in said fixed load block, a pivot load block pivotally supporting the other end of said sheave pin, a first pair of shear beam load cells fixed at one end to the support frame and pivotally connected at the other end to the fixed load block, a second pair of shear beam load cells fixed at one end to the support frame spaced from said first set and pivotally connected at the other end to said pivot load block whereby said one end of the sheave pin is fixedly supported and the other end is pivotally supported, said at least one sheave being supported in a sheave basket and the load blocks being fixed to the sheave basket on opposite ends thereof, said load blocks and shear beam load cells being pivotally connected through a ball and socket connection, and an adjustable overload stop being provided on the support frame beneath said other end of the shear beam load cell to limit its downward movement.

* * * * *